(No Model.)

J. S. TOMER.
RAIL CLEANER AND CAR FENDER.

No. 530,807.    Patented Dec. 11, 1894.

Witnesses:
A. E. Harrison.
J. A. Herron.

Inventor,
John S. Tomer.
By O. D. Levis.
Att'y.

THE NORRIS PETERS CO., PHOTO-LITHO., WASHINGTON, D. C.

UNITED STATES PATENT OFFICE.

JOHN S. TOMER, OF PITTSBURG, PENNSYLVANIA.

RAIL-CLEANER AND CAR-FENDER.

SPECIFICATION forming part of Letters Patent No. 530,807, dated December 11, 1894.

Application filed April 28, 1894. Serial No. 509,335. (No model.)

*To all whom it may concern:*

Be it known that I, JOHN S. TOMER, a citizen of the United States, residing at Pittsburg, in the county of Allegheny and State of Pennsylvania, have invented certain new and useful Improvements in Rail-Cleaners and Car-Fenders; and I do hereby declare the following to be a full, clear, and exact description of the invention, such as will enable others skilled in the art to which it pertains to make and use the same, reference being had to the accompanying drawings, which form a part of this specification.

My invention relates to an improved street rail cleaner and car fender, and it consists in certain details of construction, and combination of parts as will be fully described hereinafter.

Figure 1:
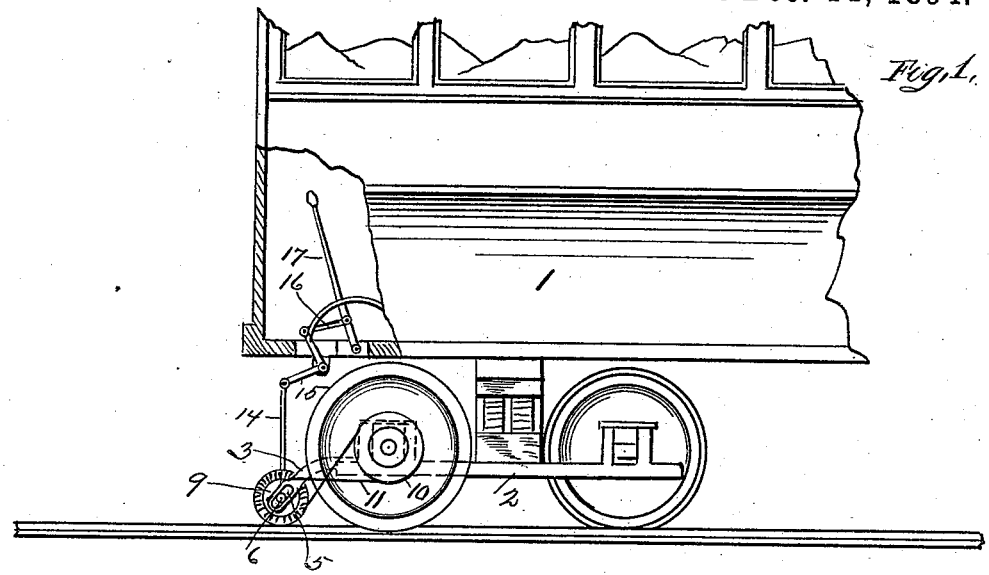
Figure 2:
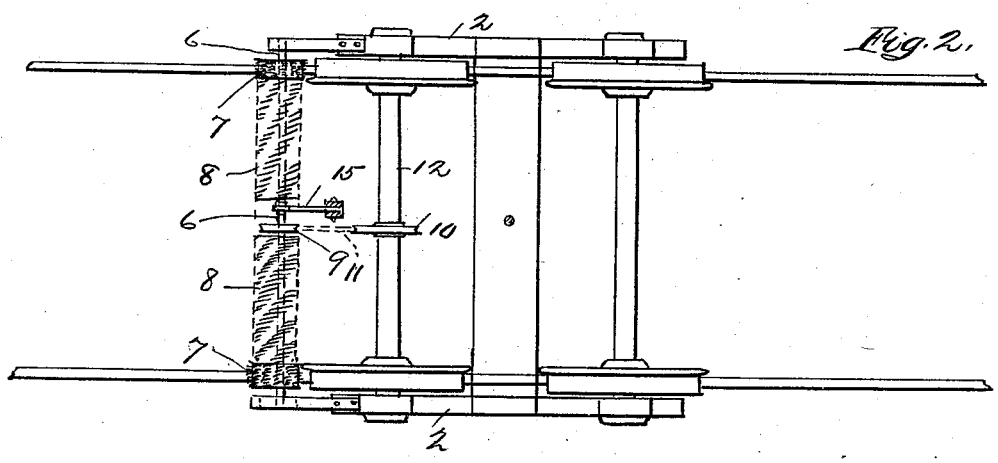
Figure 3:
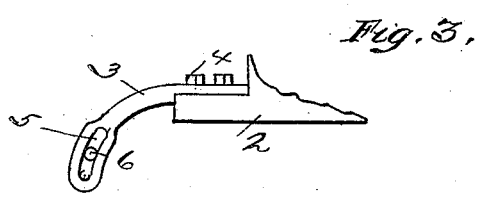

In the accompanying drawings, Figure 1 is a side elevation of my improved rail cleaner and car fender, which is constructed and arranged in accordance with my invention. Fig. 2 is a plan view of the same having the body of the car removed therefrom. Fig. 3, is an enlarged side elevation of one of the slotted brackets used in connection with my device.

To put my invention into practice with a street car 1, of ordinary construction I attach to the truck frame 2, two brackets 3 each of which is formed with slots 5 in which a shaft 6 is made to operate. Attached to this shaft 6 are brushes 7 and 8, the one 7 at each end adapted to clean the rails of the track, and the central brushes 8 to remove any obstruction from the track between the rails. These brushes 7—8 are given a rotary movement by means of a pulley 9 attached to the shaft 6 and connected by a belt 11 to another pulley 10 secured to the forward axle 12 of the car 1. This shaft 6 together with its attached brushes 7—8 may be elevated a short distance above the track by the operator operating a lever 17 arranged within the car 1. To give this movement the lever 17 is connected by means of a link 16 to a bell crank 15, which in its turn is attached by a link 14 to the shaft 6.

In operation, the brushes 7—8 are held by means of the lever 17 in an elevated position, and should the operator see any obstruction on the track or rails, the said brushes are lowered, thereby tightening the belt 11, and causing the brushes to revolve in an opposite direction to the wheels of the car. This rotary movement of the brushes will tend to lift any obstruction from the track.

Having thus described my invention, what I claim, and desire to secure by Letters Patent, is—

The herein described rail cleaner and car fender, consisting of the slotted brackets 3 attached to the forward truck of the car, the shaft 6 operating therein capable of a limited vertical movement, the brushes 7, and 8 attached to the said shaft, the pulley 9 attached to the shaft 6 and connected by a belt 11 to a pulley 10 secured to the forward axle of the car, as a means for rotating the said brushes, and the lever 17 arranged within the car, and connected by suitable cranks and links to the shaft 6, whereby the said shaft may be elevated or lowered, substantially as and for the purpose described.

In testimony that I claim the foregoing I hereunto affix my signature this 2d day of January, A. D. 1894.

JOHN S. TOMER. [L. S.]

In presence of—
ALBERT J. WALKER,
M. E. HARRISON.